US009688025B2

(12) United States Patent
Stava et al.

(10) Patent No.: US 9,688,025 B2
(45) Date of Patent: Jun. 27, 2017

(54) 3D CLEANING OBJECT FOR MULTI-PRINT-HEAD 3D PRINTING

(71) Applicant: Adobe Systems Incorporated

(72) Inventors: Ondrej Stava, San Jose, CA (US); Peter F. Falco, Jr., Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 636 days.

(21) Appl. No.: 14/150,485

(22) Filed: Jan. 8, 2014

(65) Prior Publication Data

US 2015/0190967 A1    Jul. 9, 2015

(51) Int. Cl.
| | |
|---|---|
| *B29C 67/00* | (2017.01) |
| *B33Y 10/00* | (2015.01) |
| *B33Y 30/00* | (2015.01) |
| *B33Y 50/02* | (2015.01) |
| *B33Y 40/00* | (2015.01) |

(52) U.S. Cl.
CPC ...... *B29C 67/0088* (2013.01); *B29C 67/0055* (2013.01); *B29C 67/0096* (2013.01); *B33Y 10/00* (2014.12); *B33Y 30/00* (2014.12); *B33Y 50/02* (2014.12); *B29C 67/0051* (2013.01); *B29C 67/0085* (2013.01); *B29C 67/0092* (2013.01); *B33Y 40/00* (2014.12)

(58) Field of Classification Search
CPC ........... B29C 67/0051; B29C 67/0055; B29C 67/0085; B29C 67/0088; B29C 67/0092; B29C 67/0096; B33Y 10/00; B33Y 30/00; B33Y 40/00; B33Y 50/02
USPC ............... 425/375, 174.4; 264/308, 241, 294
See application file for complete search history.

(56) References Cited

U.S. PATENT DOCUMENTS

| | | | | |
|---|---|---|---|---|
| 2008/0317894 | A1* | 12/2008 | Turley ................ | B29C 47/0877 425/226 |
| 2014/0252684 | A1* | 9/2014 | Swanson ............. | B29C 67/0096 264/401 |
| 2015/0140145 | A1* | 5/2015 | Schmehl ................ | B33Y 10/00 425/3 |

* cited by examiner

*Primary Examiner* — Alison L Hindenlang
*Assistant Examiner* — Lawrence D Hohenbrink, Jr.
(74) *Attorney, Agent, or Firm* — Wolfe-SBMC

(57) ABSTRACT

This document describes techniques and apparatuses for a three-dimensional (3D) cleaning object for multi-print-head 3D printing. These techniques are capable of cleaning leftover material from an active or inactive print head using a 3D cleaning object. This cleaning object is printed along with the desired 3D object, with the cleaning object retaining leftover material that may otherwise become an undesirable artifact of the desired 3D object.

8 Claims, 9 Drawing Sheets

3D CLEANING OBJECT FOR MULTI-PRINT-HEAD 3D PRINTING

BACKGROUND

Current techniques for three-dimensional (3D) printing include photopolymerization, granular-materials binding, and fused deposition modeling. In the case of fused deposition modeling, layers of material, such as sugar, plastic, or metal, are extruded, often in the form of strings, also called "filaments." Through extruding layer after layer of these filaments a 3D object is created. These 3D objects can include highly complex designs. In fact, almost anything that a computer can model, a fused-deposition printer can create, from candy art, to a plastic chair, to a metal sculpture.

Current fused-deposition printing techniques that print with multiple print heads, however, often produce undesirable artifacts. These undesirable artifacts are caused, in many cases, by leftover material that builds up on a tip of a print head that is not actively being used to print. Even though this print head is not printing, current techniques move an active print head and an inactive print head together. This leftover material on the inactive print head is accidentally deposited on the 3D object being printed, which results in these artifacts.

Some conventional techniques attempt to address this issue using a pre-built mechanical structure. This mechanical structure is used to clean print heads and prepare deactivated print heads for activation. This mechanical structure, however, reduces interior space in which objects can be printed, adds complication and cost to printers, slows printing, or cannot practically address artifacts in a 3D printer that is already in use.

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

SUMMARY

This document describes techniques and apparatuses for a 3D cleaning object for multi-print-head 3D printing. These techniques are capable of cleaning leftover material from an active or inactive print head using a 3D cleaning object. This cleaning object is printed along with the desired 3D object, with the cleaning object retaining leftover material that may otherwise become an undesirable artifact of the desired 3D object.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different instances in the description and the figures indicate similar or identical items.

DETAILED DESCRIPTION

Conventional techniques and apparatuses for three-dimensional (3D) printing are often unable to print, with multiple print heads, a desired 3D object without undesirable artifacts. This disclosure describes techniques and apparatuses capable of printing a desired 3D object with few or none of these undesirable artifacts through use of a 3D cleaning object.

Overview

The described techniques enable printing of 3D objects with fewer or no undesirable artifacts that are, in conventional techniques, caused when switching between print heads, as is often done when printing an object with multiple colors or materials.

Consider, for example, a 3D fused-deposition modeling (FDM) printer having two print heads, each print head having different-colored filament material. As is often the case, the two print heads are mechanically attached together, with one of the print heads being active and the other inactive. Unheated filament is provided to a print head and through a heated nozzle, where the filament is then melted and applied to build a 3D object. When an active print head is made inactive, the filament in the heated nozzle continues to flow, drip, hang, or otherwise accumulate at the print head even though the unheated filament is no longer being provided to the print head.

Leftover filament can accumulate due to melted filament within the heated nozzle, or filament that continues to melt within the heated nozzle, which proceeds out of the print head. Filament that is not fully melted can continue to melt in the heated nozzle even if the heated nozzle is no longer actively being heated because of the nozzle's thermal mass. Further, heat from the heated nozzle affects the filament that is within the print head body but that is not within the heated nozzle, potentially also causing filament within the print head body to melt and then accumulate at the nozzle tip.

Thus, in conventional techniques, leftover filament is accumulated outside deactivated print heads, and, when a recently-deactivated print head moves with the other print head, the deactivated print head drips, leaks, or otherwise applies undesirable filament material on the 3D object being printed.

Figure 1:
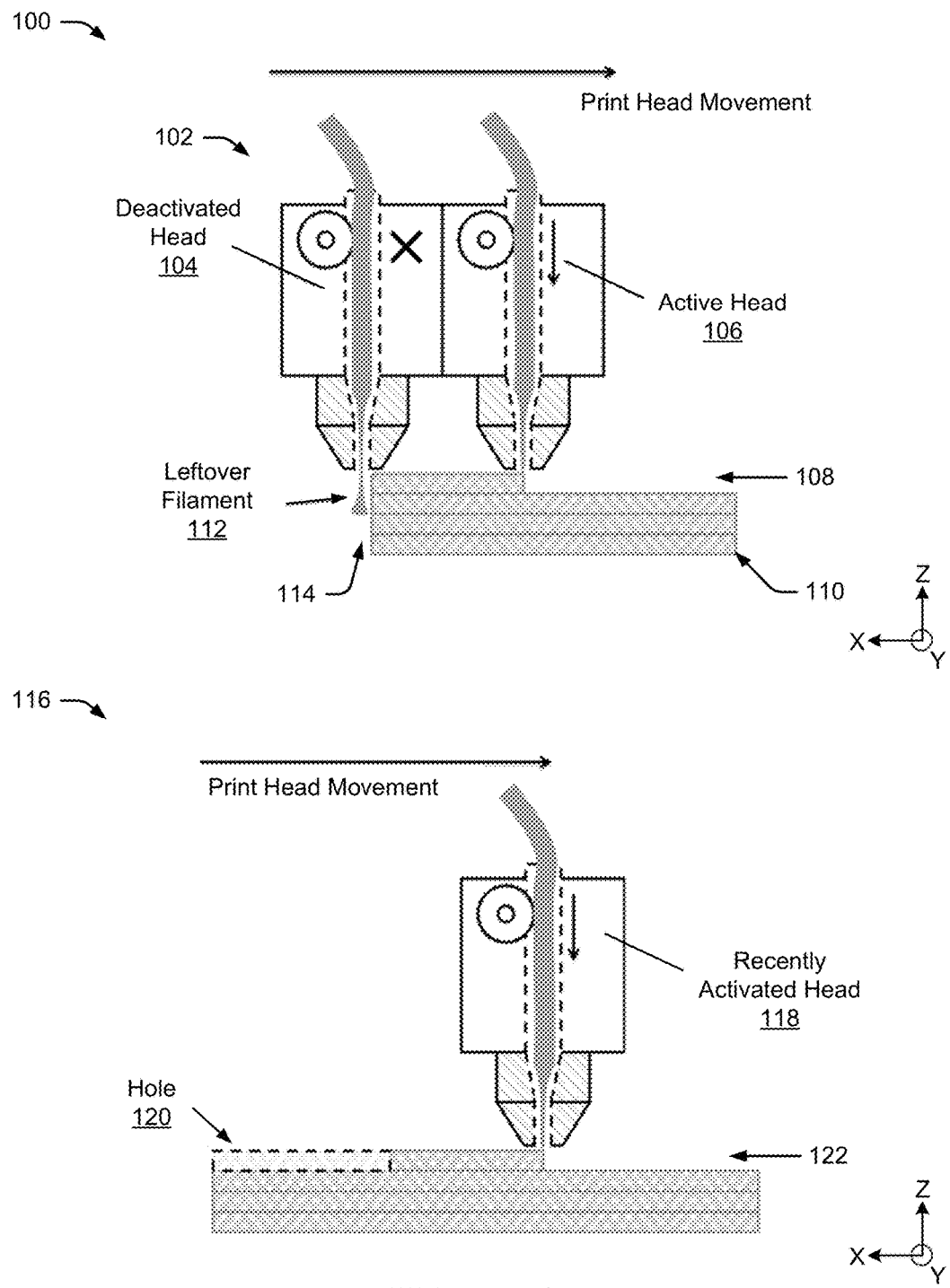
FIG. 1 illustrates artifacts caused by conventional printing techniques.

An example of this is shown in FIG. 1 at printing snapshot 100, which illustrates a two-print-head filament-providing element 102 having deactivated print head 104 (recently deactivated) and active print head 106 (recently made active and now applying heated filament). Note that active print head 106 is applying heated filament to an active layer 108 of a 3D object 110 and that leftover filament 112 is about to be accidentally applied to an edge 114 of 3D object 110.

Furthermore, melted filament that has come out of the print head, even if it does not create an artifact on the 3D object, affects printing that uses that print head when it is again made active. This is due to filament that is lost being missing from the print head. When that print head is used to apply material it will not at first do so. If this loss of material is consistent it can be compensated for, but unfortunately the amount of filament that leaks from a print head is often unpredictable. Therefore, current techniques fail to adequately compensate for this loss of filament in a print head when it is reactivated.

An example of this is shown in FIG. 1 at printing snapshot 116, which illustrates for visual simplicity one print head of two-print-head filament-providing element 102, recently-activated print head 118 being previously deactivated and now recently activated. Recently-activated print head 118 fails to apply material at hole 120 (which is assumed to be a start of an extrusion) thereby causing an undesirable void artifact on active layer 122. These are but two examples of undesirable artifacts caused by many conventional techniques when printing using multiple print heads.

As noted above, some conventional techniques attempt to address these artifacts using a pre-built mechanical structure. In contrast to this imperfect solution, the described techniques use a cleaning object that can be flexible located to use unneeded interior space in which objects are printed, does not significantly increase production costs of printers, is often faster than use of a mechanical structure, or addresses, after production of the 3D printer, these artifacts (e.g., through a downloadable printer-driver update for existing 3D printers).

The following discussion describes an operating environment, techniques that may be employed in the operating environment, and a device in which component(s) of the operating environment can be embodied. In the discussion below, reference is made to the operating environment by way of example only.

Operating Environment

Figure 2:
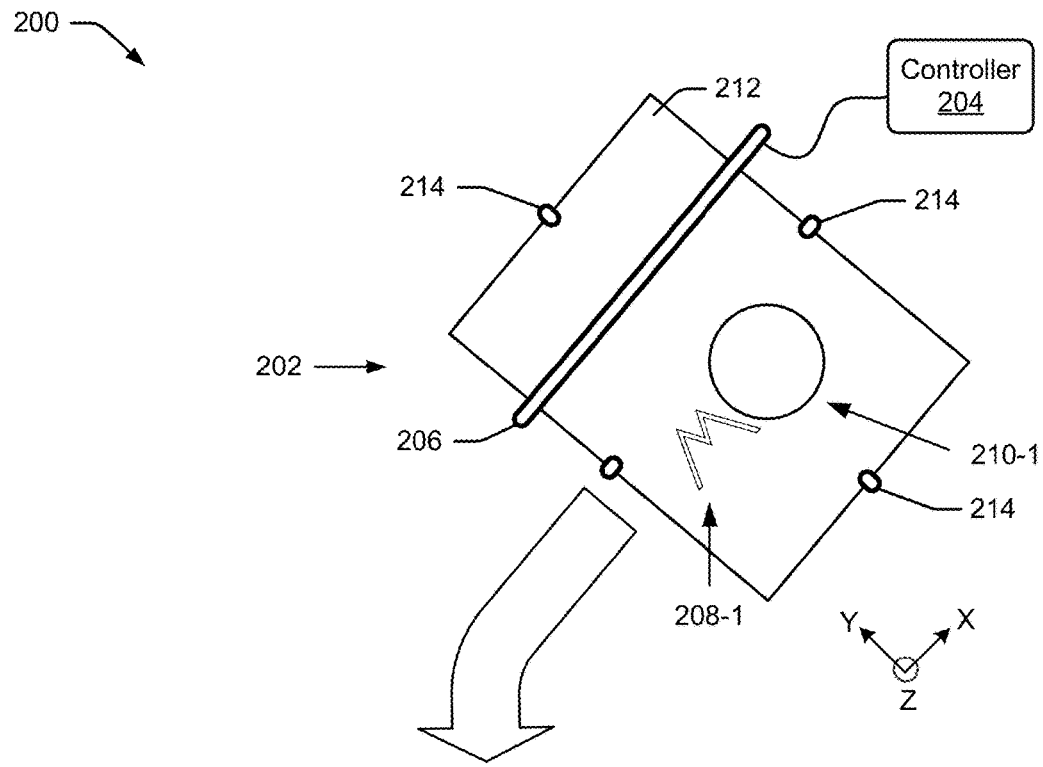
FIG. 2 illustrates an operating environment having a multi-print-head 3D fused deposition modeling (FDM) printing device having a controller and a multi-print-head filament-providing element, the printing device building a 3D object and a 3D cleaning object, as well as completed views of the 3D object and the cleaning object.
Figure 2:
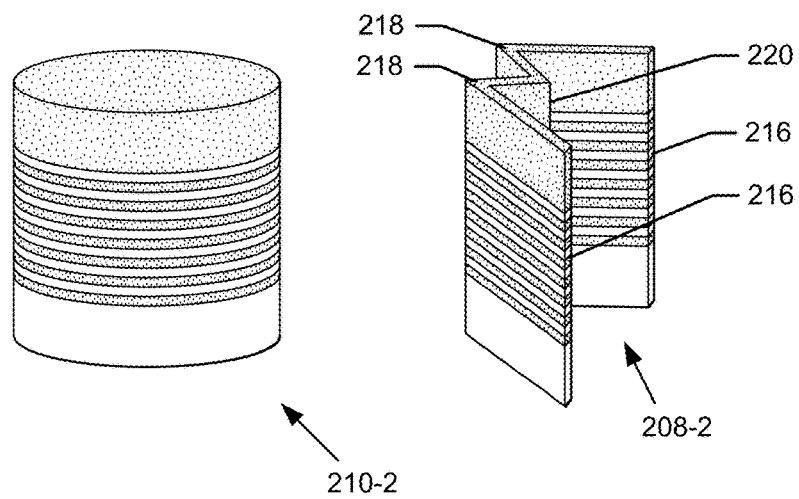

FIG. 2 illustrates an operating environment 200 that includes a multi-print-head 3D FDM printing device 202 (3D printing device 202) having a controller 204 and a multi-print-head filament-providing element 206. 3D printing device 202 is capable of building a cleaning object 208 and a desired 3D object 210, shown in the process of being printed over a plate 212 at 208-1 and 210-1, and complete (and at larger scale) at 208-2 and 210-2. Here plate 212 remains fixed while filament-providing element 206 is mechanically advanced, though filament-providing element 206 may instead be moved and plate 212 remain fixed (or both may move). 3D printing device 202 optionally includes sensors 214, which are capable of measuring the 3D objects (e.g., dimensions and locations), filament lost by a print head after deactivation, artifacts (e.g., leftover filament 112 and hole 120 of FIG. 1), filament locations, angles, luminosities, colors, and widths.

Filament-providing element 206 includes two, three, or more print heads. Filament-providing element 206 can be capable of printing filaments with different characteristics, such as filaments with different colors (red, green, and blue, or cyan, magenta, and yellow, or black and white, or black, white, red, green, and blue), filaments with different sheens (shiny and matte), and different widths, though this is not required.

Filament-providing element 206 is capable of heating and extruding filament material. This can be performed through simply applying a material previously treated to be flexible or with a low-enough viscosity to apply and then harden. In some cases, filament-providing element 206 heats a powder (e.g., powdered sugar or metal powder) or an existing strand of filament material (e.g., plastic, sugar, or metal strands drawn from a spool).

Generally, controller 204 is capable of reducing printing artifacts, such as by cleaning leftover filament from a deactivated print head of filament-providing element 206 or helping to prevent holes by extruding filament and then cleaning excess extruded element from a reactivated print head. In some cases, controller 204 is also capable of determining a location for cleaning object 208 to aid in reducing overall printing times. Controller 204 optionally may also retract and reverse retraction of filaments in filament-providing element 206, which may further aid in reducing artifacts. Ways in which controller 204 may act are set forth in greater detail below.

Figure 3:
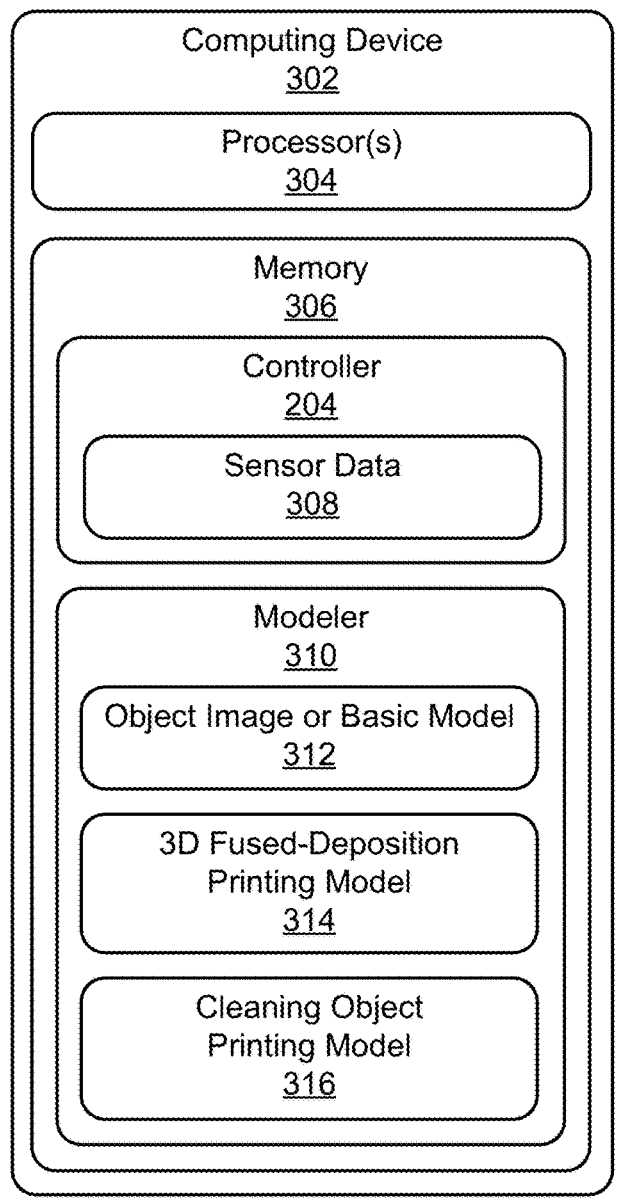
FIG. 3 illustrates a computing device having an example embodiment of the controller of FIG. 2, as well as example elements usable by the techniques.

FIG. 3 is an illustration of a computing device 302 having an example embodiment of controller 204, as well as example elements usable by the techniques. Computing device 302 includes one or more processors 304 and computer-readable storage memory ("memory") 306. Memory 306 includes controller 204, which includes or has access to sensor data 308 (from sensors 214 of FIG. 2), and modeler 310. Controller 204 can control, and/or process data for, 3D printing device 202 effective to reduce artifacts using a cleaning object for multi-print-head 3D printing. In this example embodiment, controller 204 acts through control of filament-providing element 206 of FIG. 2.

Modeler 310 includes or has access to an object image or basic model 312, which provides data about an object desired to be printed. Modeler 310 creates 3D fused-deposition printing model 314 based on object image or basic model 312. This 3D basic model or image can be of various types, including various computer-readable models (e.g., computer-aided design (CAD) drawings), a fused-deposition driver-ready model that has not been processed by the techniques to clean print heads (and thus not to build a cleaning object), or even images, such as pictures of a 3D object taken from different angles sufficient to determine the 3D object's dimensions, and so forth. In some cases controller 204 determines a location, size, and orientation of a cleaning object printing model 316 based on 3D fused-deposition printing model 314, alone or in conjunction with modeler 310.

Ways in which entities of FIGS. 2 and 3 act and interact are set forth in further detail below. While controller 204 and modeler 310 are shown separate and as computer-executable instructions executable by processor(s) 304, they may instead be hardware or firmware, or a combination of hardware, firmware, and/or software, and be integrated or separate.

Techniques Using a 3D Cleaning Object

As noted above, the techniques use a 3D cleaning object for multi-print-head 3D printing. The following methods are described in part using entities and examples of FIGS. 2 and 3, though this is for example only.

Figure 4:
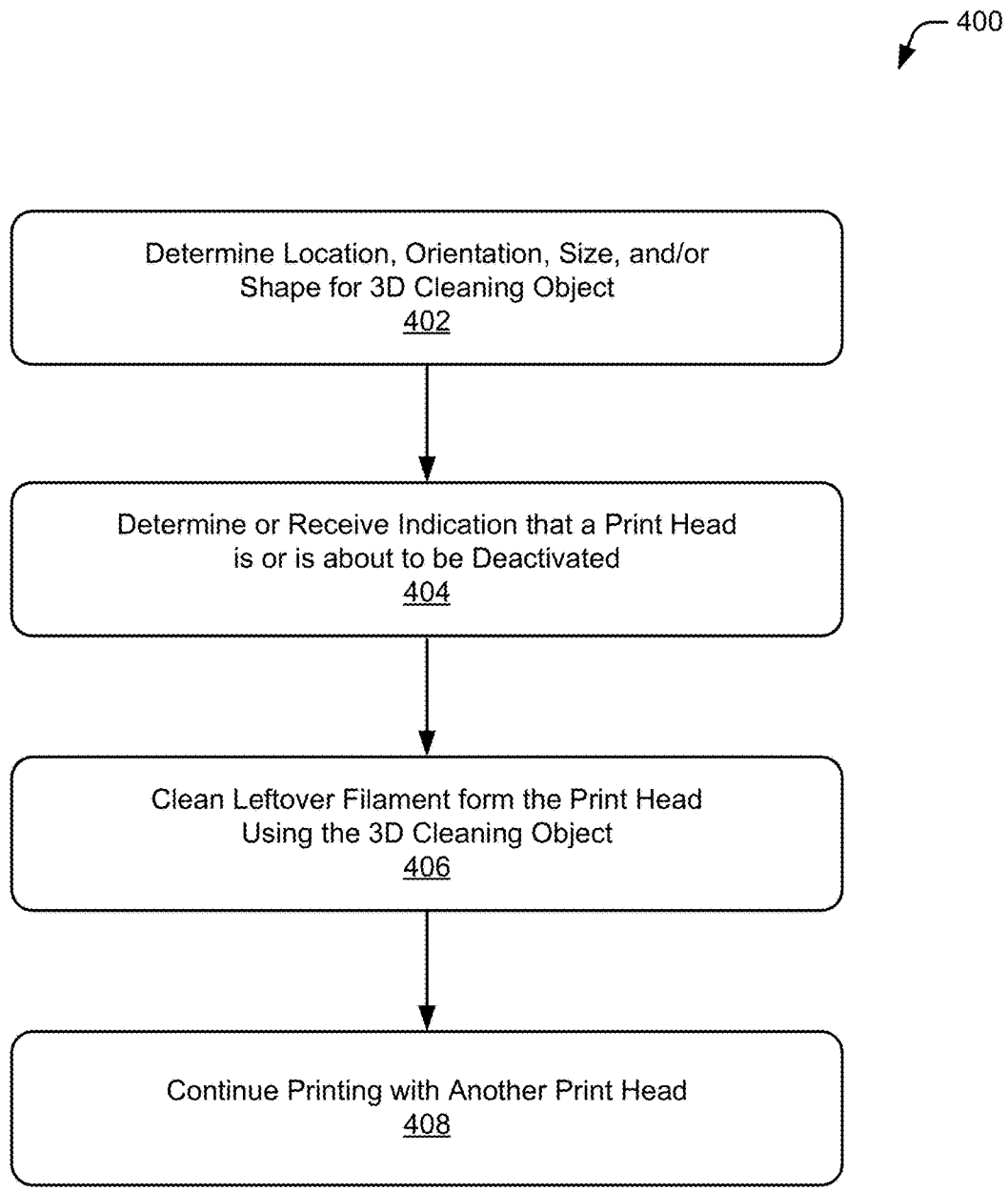
FIG. 4 illustrates example methods that use a cleaning object for multi-print-head 3D printing, including cleaning leftover filament from a deactivated print head.

FIG. 4 illustrates example methods 400 that use a 3D cleaning object for multi-print-head 3D printing, including cleaning leftover filament from a deactivated print head. The techniques, at 402, determine, based on information about a desired fused-deposition modeling (FDM) 3D object that is intended to be printed, a location, orientation, size, and/or shape for a cleaning object.

By way of example, assume that the desired 3D object is 3D object 210 of FIG. 2, which is shaped as a cylinder and has a particular height and diameter. Assume that modeler 310 of FIG. 3 receives an object image or basic model 312 for 3D object 210 and then determines a 3D FDM model 314 usable by controller 204 to create 3D object 210. Controller 204 may determine a cleaning object model 316 based on these, including having a same or similar height and a location for printing cleaning object 208 on plate 212 (e.g., a printing zone in which objects can be printed).

The location and orientation can be determined based on an overall printing time for the 3D object, such as by determining a fastest print time using known print-head speeds (e.g., speeds in the X, Y, and Z dimensions). This determination may take into account dimension-dependent speeds, such as moving filament-providing element 206 faster in the X dimension than the Y dimension or movement in the X and Y dimensions both being faster than movement in a Z dimension.

Alternatively or in addition, the location can be determined based on a net shortest distance of movement of the print heads to build the 3D object, clean leftover filament from print heads, and build the cleaning object. Other aspects of the cleaning object model 316 may also be determined, such as a shape. A shape may be determined to have supports, such as support arms 216 that are sufficient to maintain stability of the cleaning object, features relating to areas over which leftover filament is passed and therefore deposited, such as outer points 218 (here two, one for each print head, though many more can be used), and an inner point 220 for added stability.

At 404, a print head of a multi-print-head fused-deposition modeling (FDM) printer is determined to be, or an indication is received that indicates that the print head is, deactivated or about to be deactivated. This print head is of the multi-print-head FDM printer and is printing or has immediately ceased to print a portion of a 3D object. Continuing the ongoing example, assume that 3D printing device 202 has up to this point in methods 400 printed multiple layers of white filament sufficient to complete the white lower portion of 3D object 210 of FIG. 2, shown in process as 210-1, but just prior to printing any gray filaments. Thus, at this point only one print head has been printing, a white-filament print head of filament-providing element 206. The white-filament print head, therefore, is being deactivated.

Alternatively or in addition, the techniques may deactivate the print head (rather than determine or receive indication of its deactivation). Further, the techniques, such as through controller 204, may retract filament being fed into a heated nozzle of the now-deactivated print head. Note that this assumes that the filament is fed into the heated nozzle, such as is illustrated in part in FIG. 1. While not required, this retraction of filament being fed can reduce an amount of leftover filament that collects at the print head.

At 406, responsive to the determination or indication, leftover filament is cleaned from the print head using the cleaning object. As noted, this cleaning object can be printed in conjunction with the 3D object, such as layer-by-layer (e.g., no movement by the filament-providing element 206 in the height dimension until layers are printed on both objects) or print-head-by-print-head (e.g., color-by-color).

Continuing the ongoing example, assume that either: each layer of both 3D object 210 and cleaning object 208 are printed prior to another layer; or that layers are printed for one and then the other for a print head that remains active. In this second case, assume that prior to switching from the white to the grey print head, fifty white layers are printed. Controller 204 may print these 50 layers first for cleaning object 208 and then 50 layers for 3D object 210, or one-by-one, or some combination of these. This can be based on printing speed or other factors.

In either case, leftover filament from the now-deactivated white print head is cleaned off by controller 204 on cleaning object 208. This operation of cleaning off leftover filament from a now-deactivated print head can be performed through various manners, such as moving the now-deactivated print head immediately to cleaning object 208 and making movements that would, if filament were being provided, print the filament on cleaning object 208. Controller 204 may also or instead determine a path by which leftover filament is captured by cleaning object 208.

Figure 5:
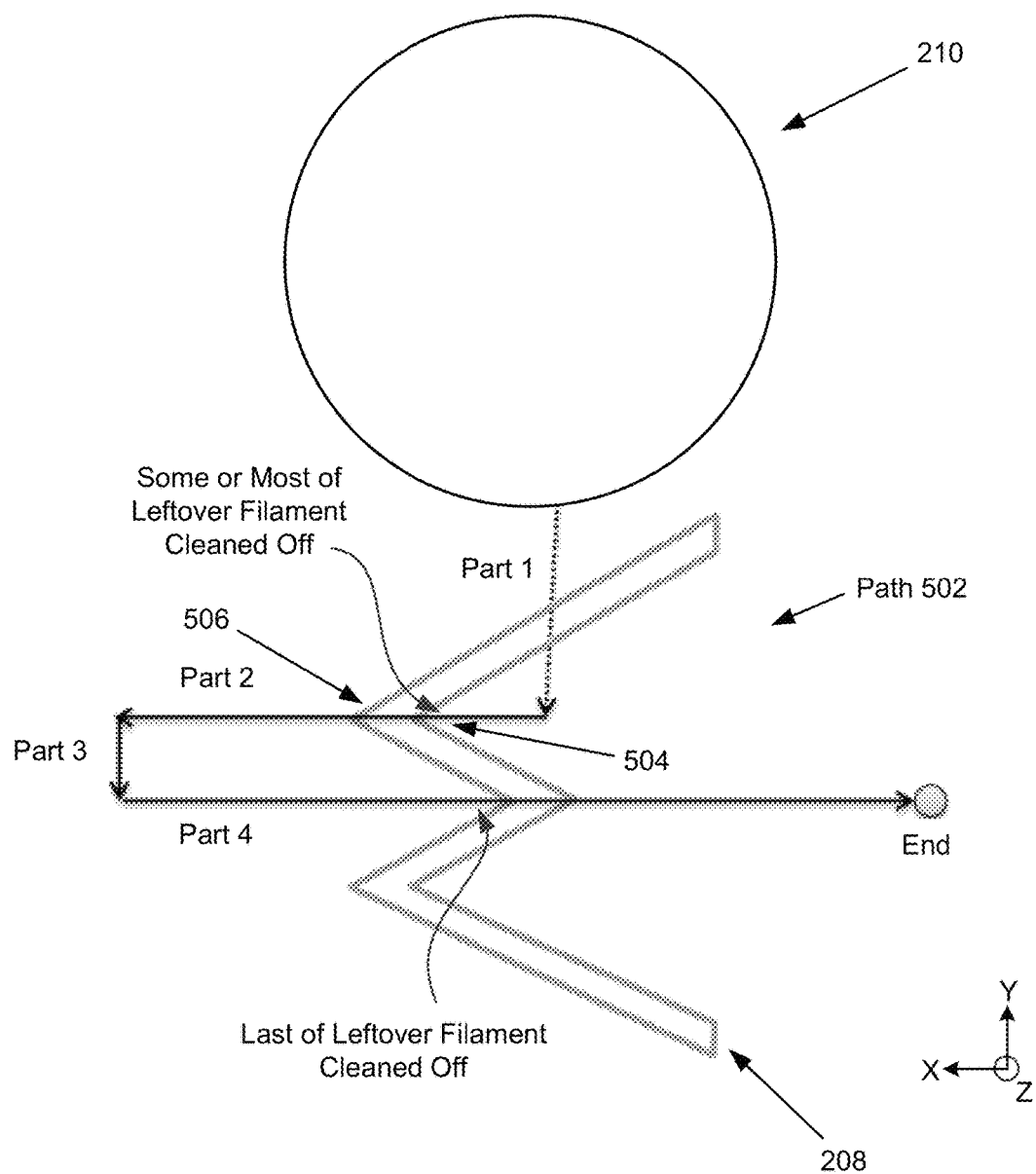
FIG. 5 illustrates a path determined by the controller of FIG. 2 for cleaning a print head.

Consider FIG. 5, which illustrates a path 502 determined by controller 204 for the print head. At part 1, controller 204 causes a now-deactivated print head (not shown) to move from printing 3D object 210 towards cleaning object 208. At part 1, the print head passes over a support structure for cleaning object 208. Assume that little or no filament has yet accumulated at a tip of the print head, as this accumulation often takes some small amount of time, and thus little or no leftover filament is captured at part 1. By the beginning of part 2, however, some or most of the eventual total leftover filament has accumulated. During movement of the print head's nozzle across cleaning object 208 at part 2, leftover filament is captured at an interior region 504 of exterior point 506. To aid in ensuring that all or nearly all accumulated leftover filament is captured prior to printing with another print head (and thus usually passing the now-deactivated print head over 3D object 210), the path includes later portions of part 2 as well as parts 3 and 4. At a later portion of part 2, controller 204 causes the print head to move away from cleaning object 208, at part 3 to move toward another portion of cleaning object 208 intended to accumulate leftover filament, and then at part 4 to move across exterior region 508 of interior point 510 to capture the last (if any) of leftover filament. Note that path 502 can determined, or adjusted based on results (e.g., from sensor data 308), a length, time spent on, or number of passes over cleaning object 208, for the path to reliably ensure that the leftover filament is cleaned off. Similarly, path 502 can be shortened in length, time, or number of passes if leftover filament is cleaned off without need of the path length, path time, or number of passes over the cleaning object.

At 408, printing continues with another print head. Concluding the ongoing example, a first layer of gray filament is printed for 3D object 210 of FIG. 2. In some cases this other print head is a reactivated print head that can create holes and various void artifacts, in which case the techniques may continue with methods 600, set forth below. Note that methods 400 and 600 may operate alone or in combination, in whole or in part.

With the above case of a deactivated print head set forth, the discussion now turns to an example manner in which the techniques may reduce artifacts for a print head that is reactivated.

Figure 6:
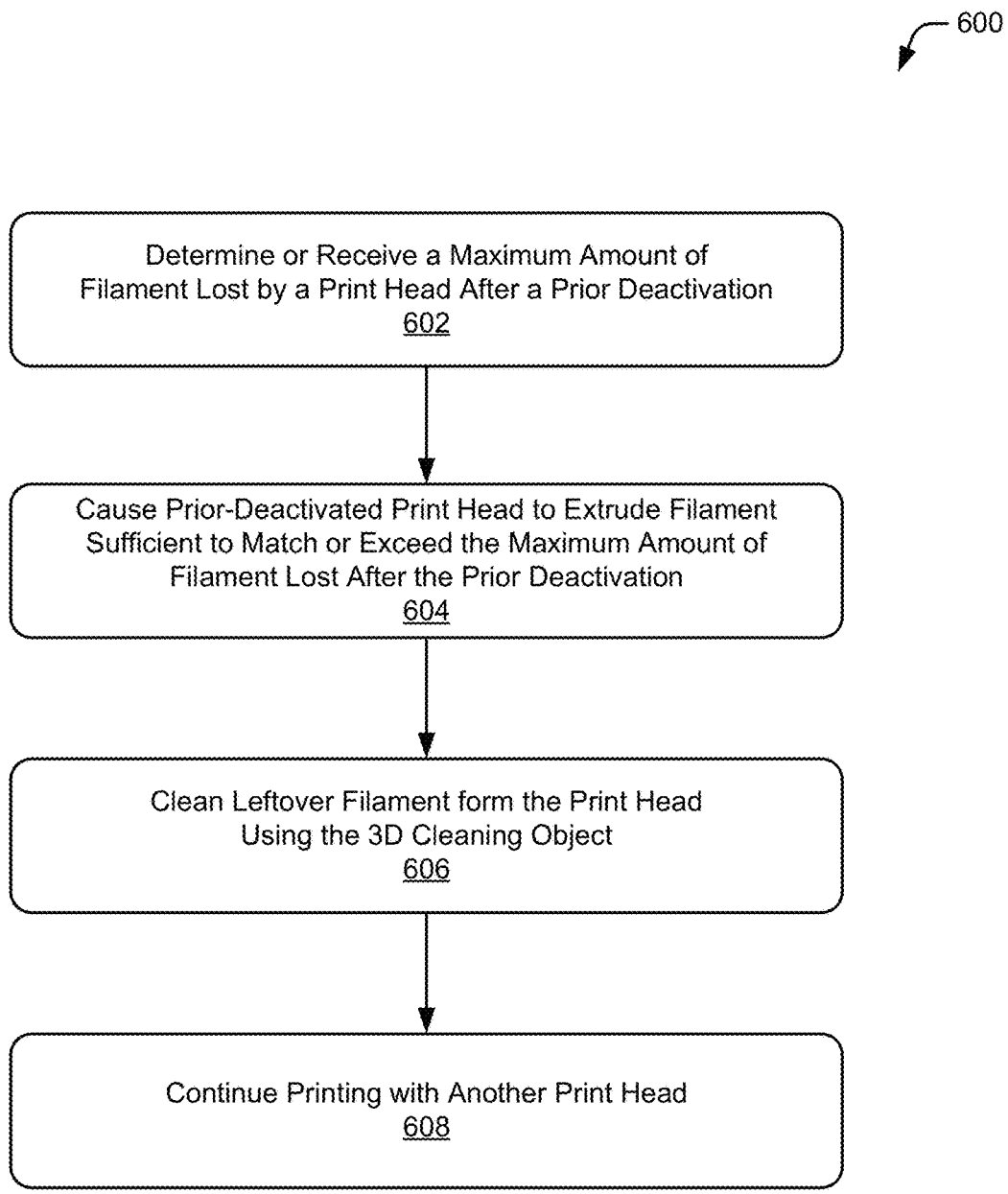
FIG. 6 illustrates example methods using a cleaning object for multi-print-head 3D printing to reduce or remove void artifacts caused by a reactivated print head.

FIG. 6 illustrates example methods 600 that use a 3D cleaning object for multi-print-head 3D printing to reduce or remove void artifacts for a reactivated print head. In the example described below, the techniques "re-fill" filament previously lost from a print head and clean excess refiled filament, if any, from a reactivated print head prior to printing with that print head. Method 600 may stand alone or build on methods 400, in whole or in part. Thus, while not expressly illustrated, methods 600 may perform operation 402 to determine a location, orientation, size, and/or shape for a cleaning object prior to building and using that object.

At 602, a maximum amount of filament lost by a print head after a prior deactivation of that print head is received or determined. The maximum amount can be received based on a filament's material composition, print head, or printing device's manufacturer's data, for example. It may instead be determined, such as based on historical sensor data for that print head, that filament, temperatures used for the nozzle, that printing device, and so forth. It may also or instead be determined based on actual sensor data measuring the filament lost by the print head during the immediately prior deactivation, such as an amount of filament captured at a region of cleaning object 208. Each of these maximum amounts may also include a safety or inaccuracy factor to increase a robustness for reducing or eliminating void artifacts.

At 604, responsive to a determination to reactivate a print head of a multi-print-head printer after a prior deactivation of the print head, the print head is caused to extrude, near a printed cleaning object within a print area also having an 3D object being printed, filament sufficient to match or exceed the maximum amount of filament lost after the prior deactivation.

At 606, after extrusion of the filament sufficient to match or exceed the maximum amount, the print head follows a cleaning path to cause filament exceeding an actual amount of filament lost after the prior deactivation of the print head to be captured by the cleaning object and thus cleaned from the print head. It some cases an amount of filament exceeding the actual amount is small and easily captured without adverse effects on cleaning object 208. In such a case a single pass of the print head over the cleaning object after the extrusion is effective. In some cases, however, determined maximum amounts of filament lost are significantly higher than some actual amounts lost, as can be the case when the maximum amount is set high for good robustness, or the actual amounts of filaments lost vary significantly, and thus the maximum is sometimes well over the actual amounts lost. In such a case multiple passes over the cleaning object can be used. After cleaning leftover filament at 606, methods 600 proceed, at 608, to continue printing with another print head.

Figure 7:
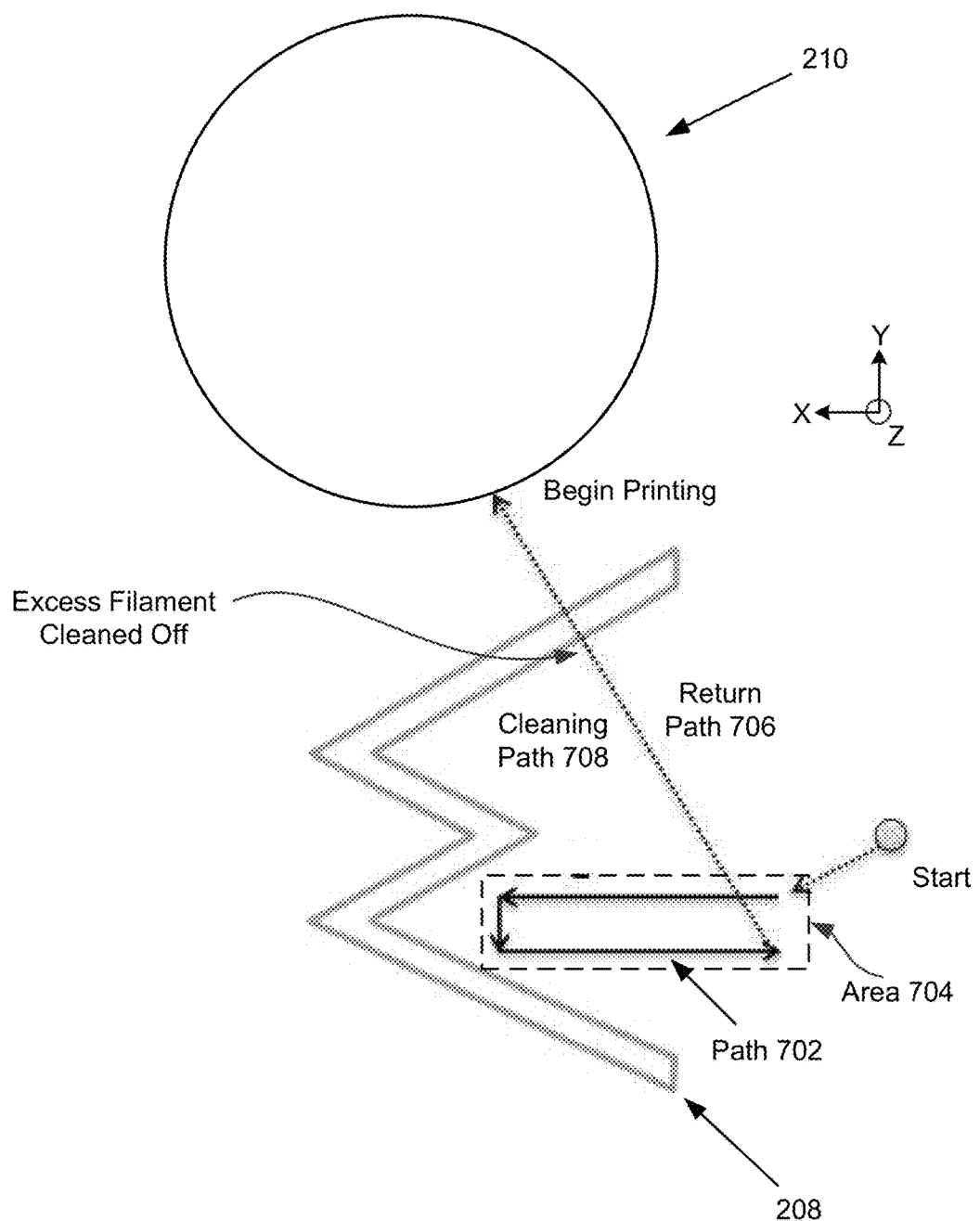
FIG. 7 illustrates an extrusion path in an extrusion area near a cleaning object.

By way of example, consider FIG. 7, which illustrates an extrusion path 702 in an extrusion area 704 near to cleaning object 208. Here controller 204 causes the reactivated print head to extrude filament to make up for filament possibly lost at an immediately-prior deactivation of the print head. As shown, the path is one in which filament can be extruded without accidentally being applied to 3D object 210. Note also that extrusion area 704 is within and near regions of cleaning object 208. One reason for this is that a return path 706 can double as a cleaning path 708. By so doing, a short return movement of the print head can be used, thereby enabling faster printing.

As noted, however, in some cases multiple passes over the cleaning object are used. Consider again path 502 of FIG. 5. Rather than return path 706, the techniques may instead follow a cleaning path similar to the path used for cleaning a deactivated print head. Path 502, as shown, proceeds from near to the cleaning object and, unlike return path 706, which passes over a region of the cleaning object on its way to printing the 3D object, instead passes over two regions of cleaning object 208.

By way of another example, consider again the example given for methods 400 in which a print head printing white filament is deactivated and cleaned. Another print head of the printing device is then activated, here assume that the other print head is used to print gray filament. The techniques print with the white-filament print head until it is deactivated, at which time it is cleaned as noted for methods 400. Then the gray-filament print head is activated, filament is extruded to address void artifacts, excess extruded filament is cleaned, and the printing device prints gray filament to build 3D object 210. This process is repeated for each change (also called a "switch") from one head to another. By so doing, 3D object 210 is created with fewer artifacts from leftover filament and from voids.

Note that in cases where the techniques retract filament on deactivation of a print head that the techniques may reverse this retraction as part of methods 600, such as prior to or when starting path 702 of FIG. 7.

As noted in the discussion of ways in which the cleaning object can be built in conjunction with the 3D object, printing each layer-by-layer can reduce movement in the Z (height) dimension due to the heights of the last-applied layers of the 3D object and the cleaning object being the same or within one, two, or three filament widths, which for many filament materials is sufficient for the cleaning object to capture leftover filament from the print head. In some cases the techniques print the cleaning object to a height at which a returning, deactivated print head will be when it is complete. This may be layer-by-layer or by printing multiple layers of the cleaning object and then the 3D object such that a final layer of the 3D object printed is at a same final height.

While these examples are provided in the context of printing planar layers, this is not required by the techniques. Non-planar, complex, and printing with full movement in the X, Y, and Z dimensions for a single layer or layer portion are permitted by the techniques.

Figure 8:
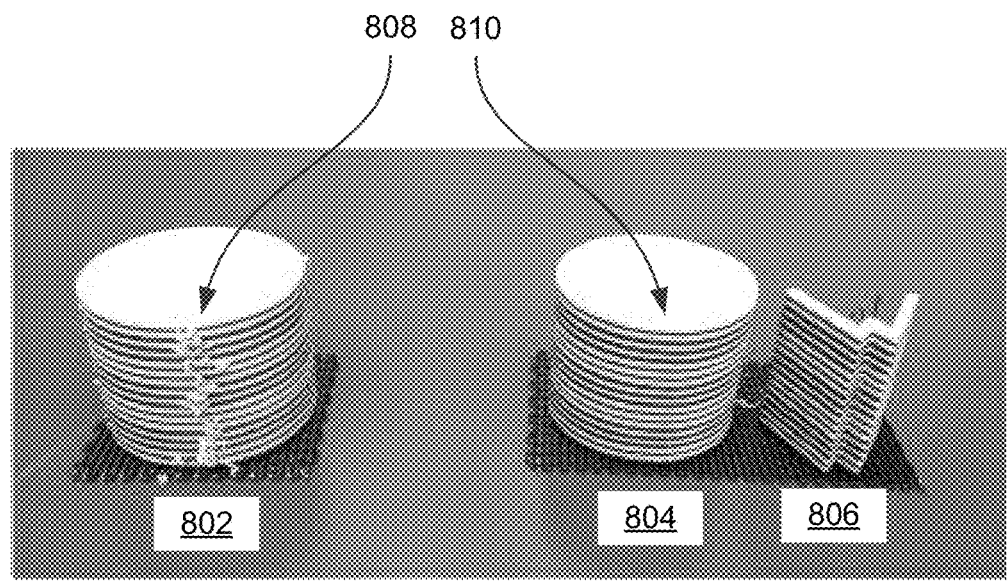
FIG. 8 illustrates a conventionally-printed, actual 3D object and an actual 3D object and cleaning object both of which are printed using the techniques.
Figure 8:
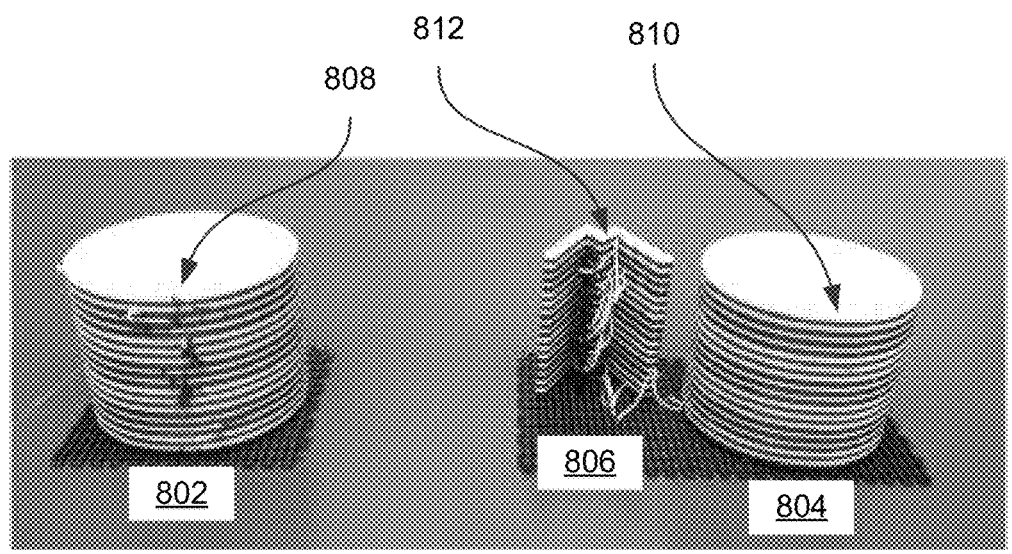

Concluding the above example, consider FIG. 8, which shows two views of a conventional, actual 3D object 802 printed without use of the techniques and an actual 3D object 804 and cleaning object 806 both of which were built with the techniques. Actual 3D object 804 and cleaning object 806 were printed using a two-head 3D FDM printer, controller 204, two print heads (mechanically attached as part of a single filament-providing element) with one head printing heated, extruded black filament and the other head printing heated, extruded white filament. Note artifacts 808 for conventional 3D object 802, a lack of artifacts 810 for 3D object 804, and artifacts 812 on cleaning object 806.

Example Device

Figure 9:
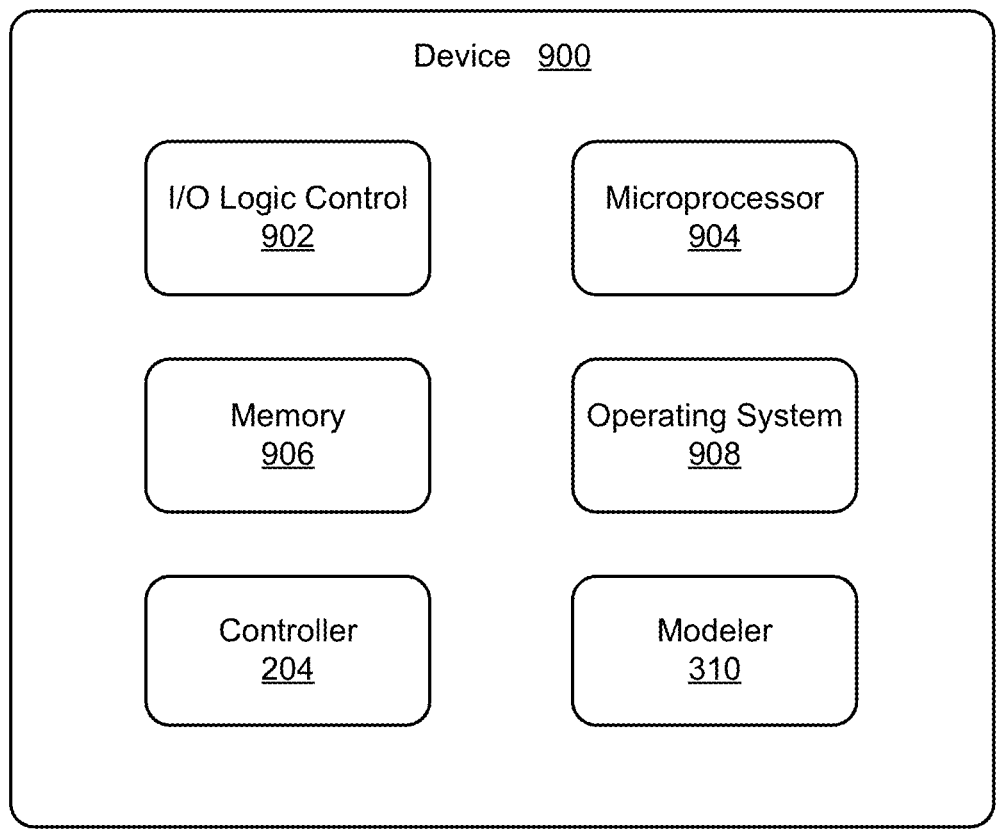
FIG. 9 illustrates a device for implementing embodiments of the techniques.

FIG. 9 illustrates a device 900, which can implement various embodiments described above. Device 900 can be implemented in a fixed or mobile device of various types, such as a 3D printer or element thereof. Device 900 can be integrated with electronic circuitry, a microprocessor, memory, input-output (I/O) logic control, communication interfaces and components, other hardware, firmware, and/or software needed to run an entire device (e.g., 3D printing device 202). Device 900 can also include an integrated data bus (not shown) that couples the various components of the device for data communication between the components. A device that includes device 900 can also be implemented with many combinations of differing components.

In this example, device 900 includes various components such as an input-output (I/O) logic control 902 (e.g., to include electronic circuitry) and a microprocessor 904 (e.g., any of a microcontroller or digital signal processor). Device 900 also includes a memory 906, which can be any type of random access memory (RAM), a low-latency nonvolatile memory (e.g., flash memory), read only memory (ROM), and/or other suitable electronic data storage. Device 900 can also include various firmware and/or software, such as an operating system 908, which can be computer-executable instructions maintained by memory 906 and executed by microprocessor 904. Device 900 can also include other various communication interfaces and components, wireless LAN (WLAN) or PAN (WPAN) components, other hardware, firmware, and/or software.

Device 900 includes controller 204 and/or modeler 310 and also may include various components of FIG. 3. Controller 204 and modeler 310 in device 900, either independently or in combination with other entities, can be implemented as computer-executable instructions maintained by memory 906 and executed by microprocessor 904 to implement various embodiments and/or features described herein, such as using a 3D cleaning object for multi-head 3D printing to reduce printing artifacts. Controller 204 or modeler 310 may also be provided integral with other entities of the device. Alternatively or additionally, controller 204, modeler 310, and the other components can be implemented as hardware, firmware, fixed logic circuitry, or any combination thereof that is implemented in connection with the I/O logic control 902 and/or other signal processing and control circuits of device 900.

Although the subject matter has been described in language specific to structural features and/or methodological operations, the subject matter defined in the appended claims is not necessarily limited to the specific features or operations described above, including orders in which the operations are performed.

What is claimed is:

1. A three-dimensional (3D) printing device comprising:
one or more computer processors; and
one or more computer-readable storage media having instructions stored thereon that, responsive to execution by the one or more computer processors, perform operations comprising:
determining a location at which to print a 3D cleaning object, the determining based at least in part on an intended location at which to print a 3D object;
causing a multi-head filament-providing element to print, with one or more print heads of the multi-head filament-providing element, a layer of the 3D cleaning object and a portion of a layer of the 3D object; and
responsive to a determination that a first print head of the multi-head filament-providing element is being deactivated and a second print head of the multi-head filament-providing element is being activated:
cleaning leftover filament from the first print head by passing the first print head over a first portion of the 3D cleaning object;
extruding filament from the second print head, the extrusion sufficient to match or exceed a maximum amount of filament lost during a prior deactivation of the second print head, the maximum amount of filament determined based on historical sensor data for filament historically lost after deactivating the second print head;
cleaning some or all of the extrusion from the second print head by passing the second print head over a second portion of the 3D cleaning object; and
printing a portion of the 3D object using the second print head.

2. The 3D printing device of claim 1, the operations further comprising determining, responsive to printing the portion of the 3D object, that the layer of the 3D object being printed is complete, and, responsive to determining that the layer is complete, printing another layer of the 3D cleaning object.

3. The 3D printing device of claim 1, the operations further comprising repeating the operations of cleaning leftover filament, extruding filament, cleaning some or all of the extrusion, and printing the portion, the repeating for each deactivation and reactivation of two respective print heads of the 3D printing device.

4. The 3D printing device of claim 1, the operations further comprising printing one or more support legs and multiple outer tips of the 3D cleaning object, the multiple outer tips matching a number of print heads of the multi-head 3D printer.

5. The 3D printing device of claim 1, wherein the operation of determining the location is based on an overall printing time for the 3D object.

6. The 3D printing device of claim 5, the overall printing time is determined based on variances between print-head speeds in each of three dimensions.

7. The 3D printing device of claim 1, wherein the operation of passing the first print head over the first portion of the 3D cleaning object follows a path passing over the 3D cleaning object two or more times.

8. The 3D printing device of claim 1, wherein the operation of passing the second print head over the second portion of the 3D cleaning object is sufficient to cause excess filament of the extrusion that exceeds an actual amount of filament lost after the prior deactivation of the print head to be captured by the 3D cleaning object.

* * * * *